UNITED STATES PATENT OFFICE.

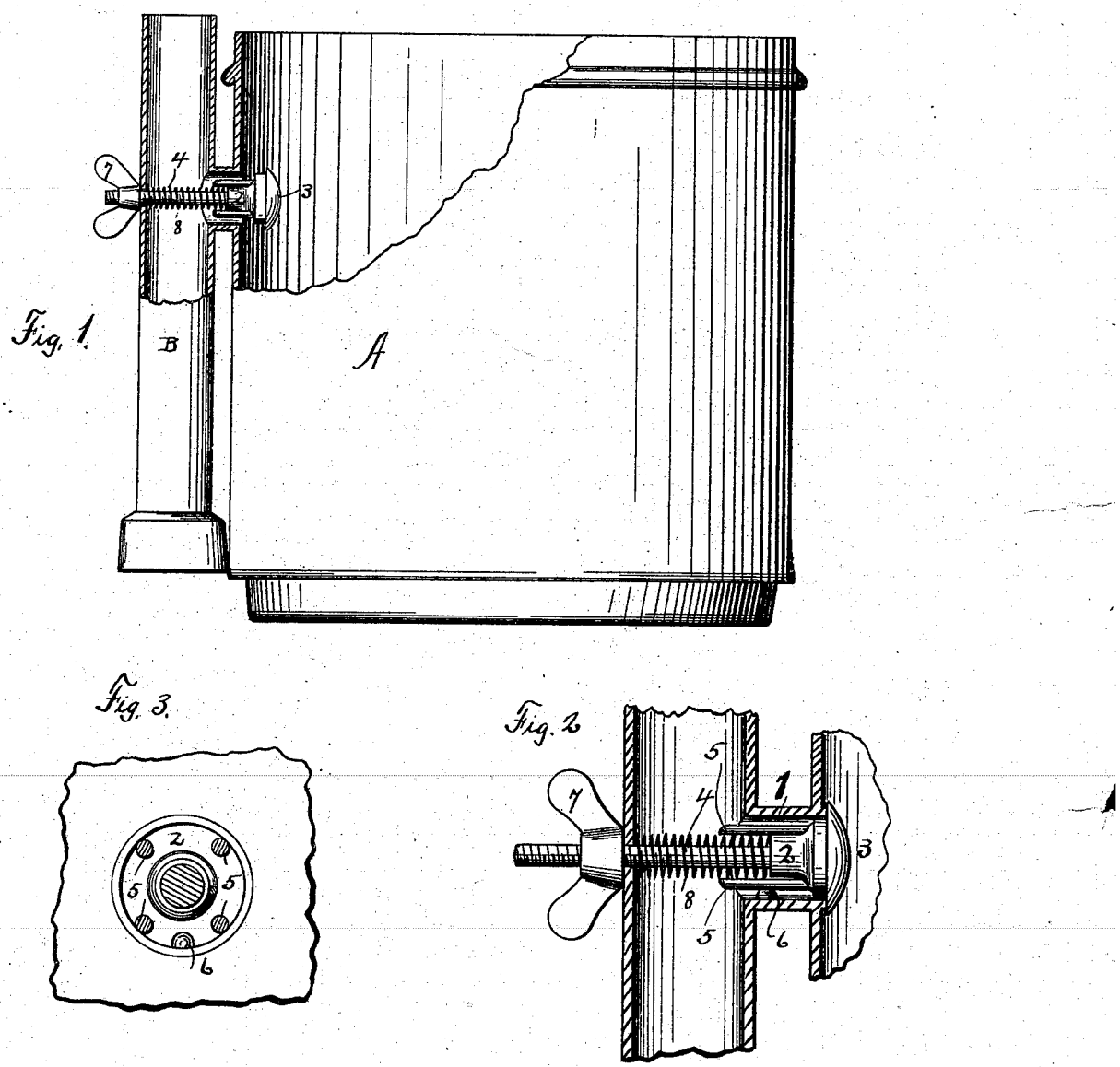

ELLSWORTH P. DOTY, OF WEEDSPORT, NEW YORK.

VALVE FOR COOKERS.

SPECIFICATION forming part of Letters Patent No. 503,787, dated August 22, 1893.

Application filed February 25, 1893. Serial No. 463,772. (No model.)

*To all whom it may concern:*

Be it known that I, ELLSWORTH P. DOTY, of Weedsport, in the county of Cayuga, in the State of New York, have invented new and useful Improvements in Valves for Cookers, of which the following, taken in connection with the accompanying drawings, is a full, clear, and exact description.

My invention relates to steam cookers, and particularly to the construction and operation of the valves which admit the steam into the cooking chamber.

My object is to produce a valve for a steam cooker which may be easily and readily operated in connection with each cooking compartment, for the purpose of admitting little or much steam into the compartment to cause the article of food to be cooked gradually or quickly as desired.

My invention consists in the several novel features of construction and operation hereinafter described and which are specifically set forth in the claims hereunto annexed. It is constructed as follows, reference being had to the accompanying drawings, in which—

Figure 1, is a side view of one section of a cooker, with a portion of it broken away, showing the valve open. Fig. 2, is an enlarged view of a portion of the cooker and steam valve, showing the valve closed. Fig. 3, is an end view of the duct leading to the cooking compartment, the outer end of the valve being removed.

A, is a cooking compartment; and B, is a steam pipe having a duct —1— leading therefrom to the cooking compartment.

2, is a valve adapted to fit into the duct, having a head —3— on its inner end and provided on its outer end with a threaded shank —4—. The valve —2— is provided with guide-pieces —5—, which travel in the duct —1—; and —6— is a lug in one side of the duct adapted to engage with the guide-pieces —5— when the thumb-screw —7— is turned upon the threaded shank —4— for the purpose of opening and closing the valve.

8, is a coil-spring surrounding the shank —4—, interposed within the steam pipe —B— for the purpose of producing a tension to throw the valve —2— inwardly when the thumb-screw —7— is unscrewed.

It will be observed that by having a valve leading from the steam pipe to each compartment, I am enabled to very readily and easily regulate the amount of steam which passes into each compartment.

What I claim as my invention, and desire to secure by Letters Patent, is—

1. A valve for a steam pipe, comprising a body having a head upon one end, guide-pieces, a threaded shank, a thumb-screw adapted to engage therewith, and a spring interposed between the valve and the thumb-screw, as set forth.

2. The combination with a cooking compartment, the steam pipe, and a duct leading therefrom, of a valve provided with guide-pieces adapted to travel in said duct, and having a head on its inner end, a threaded shank on its outer end, a thumb-screw adapted to engage therewith, and a spring interposed between the valve and thumb-screw, as set forth.

3. The combination with a cooking compartment, a steam pipe, a duct leading therefrom, of a valve having guide-pieces, a head upon its inner end, a threaded shank, a thumb-screw adapted to engage therewith, a spring interposed between the valve and the thumb-screw, and a lug upon the inner face of the duct to prevent the valve from rotating when the set screw is turned, as set forth.

In witness whereof I have hereunto set my hand this 23d day of February, 1893.

ELLSWORTH P. DOTY.

In presence of—
HOWARD P. DENISON,
C. B. WINNE.